United States Patent
Dölling et al.

(12)

(10) Patent No.: US 6,422,005 B2
(45) Date of Patent: Jul. 23, 2002

(54) PROCESS AND APPARATUS FOR THE CATALYTIC ELIMINATION OF A POLLUTANT FROM THE EXHAUST GAS FROM A COMBUSTION INSTALLATION

(75) Inventors: Winfried Dölling, Weissenbrunn; Reinhard Latsch, Sinsheim; Wieland Mathes; Ronald Neufert, both of Michelau; Rainer Tost, Nürnberg; Dietmar Weisensel, Sinzing; Klaus Wenzlawski, Nürnberg; Jürgen Zürbig, Burgkunstadt, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/815,201

(22) Filed: Mar. 22, 2001

Related U.S. Application Data

(63) Continuation of application No. PCT/DE99/02857, filed on Sep. 9, 1999.

(30) Foreign Application Priority Data

Sep. 22, 1998 (DE) .......................................... 198 43 423

(51) Int. Cl.[7] ................................................ F01N 3/00
(52) U.S. Cl. ............................ 60/286; 60/274; 60/303; 60/297
(58) Field of Search ........................... 60/274, 286, 303, 60/297, 301, 295

(56) References Cited

U.S. PATENT DOCUMENTS

| | | | | | |
|---|---|---|---|---|---|
| 5,842,341 A | * | 12/1998 | Kibe | ............................ | 60/274 |
| 5,974,794 A | * | 11/1999 | Gotoh et al. | .................... | 60/286 |
| 5,996,337 A | * | 12/1999 | Blosser et al. | ................. | 60/274 |
| 5,996,338 A | * | 12/1999 | Hirota | ............................ | 60/285 |
| 6,119,448 A | * | 9/2000 | Emmerling et al. | ........... | 60/274 |
| 6,161,378 A | * | 12/2000 | Hanaoka et al. | .............. | 60/286 |

* cited by examiner

*Primary Examiner*—Thomas Denion
*Assistant Examiner*—Binh Tran
(74) *Attorney, Agent, or Firm*—Laurence A. Greenberg; Werner H. Stemer; Ralph E. Locher

(57) ABSTRACT

A process for catalytic removal of a pollutant from a combustion installation exhaust gas includes calculating, from operationally relevant parameters of the installation, a pollutant concentration using a predetermined characteristic diagram. A predetermined quantity of a reagent is introduced into the exhaust per unit time as a function of the calculated pollutant concentration, the reagent reacting with the pollutant at a catalytic converter. Operating states of the installation with substantially constant pollutant emission levels are determined. The pollutant concentration during an operating state of the installation with a substantially constant pollutant emission level is determined with a sensor and only a pollutant concentration from the installation in a steady operating state is used to correct the diagram. The pollutant concentration from the installation is calculated with the diagram in a non-steady operating state. An apparatus for the catalytic removal of the pollutant from the exhaust gas is also provided.

16 Claims, 1 Drawing Sheet

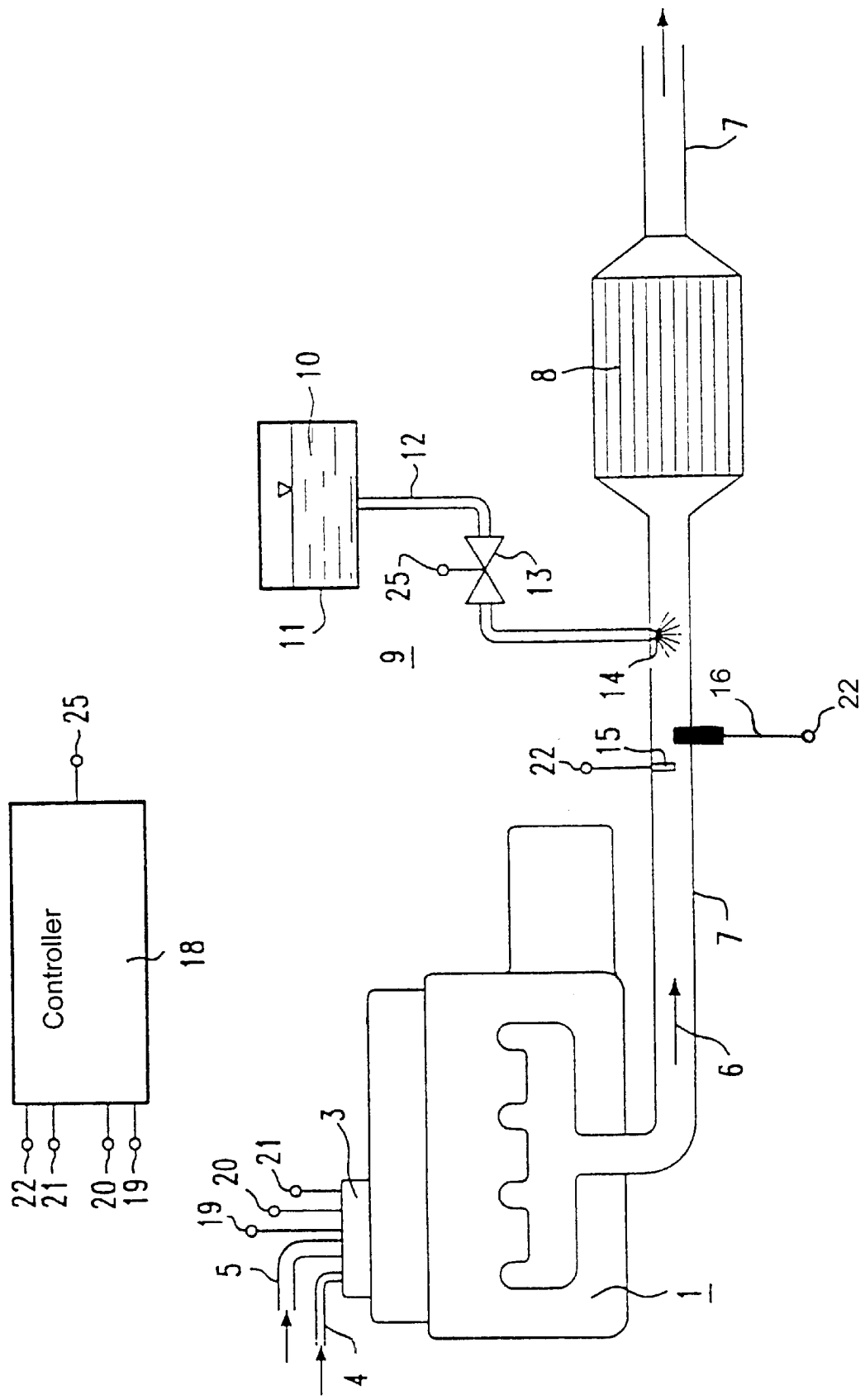

PROCESS AND APPARATUS FOR THE CATALYTIC ELIMINATION OF A POLLUTANT FROM THE EXHAUST GAS FROM A COMBUSTION INSTALLATION

CROSS-REFERENCE TO RELATED APPLICATION

This application is a continuation of copending International Application No. PCT/DE99/02857, filed Sep. 9, 1999, which designated the United States.

BACKGROUND OF THE INVENTION

Field of the Invention

The invention lies in the field of catalytic converters. The invention relates to a process for the catalytic elimination of a pollutant from the exhaust gas from a combustion installation, in particular, a diesel engine. The concentration of the pollutant in the exhaust gas is calculated by a predetermined characteristic diagram from an operationally relevant parameter of the combustion installation. A predetermined quantity of a reagent is introduced into the exhaust gas per unit time as a function of the calculated concentration of the pollutant and is reacted with the pollutant at the catalytic converter. The invention also relates to an apparatus for carrying out the above-mentioned process.

During the combustion of a fossil fuel or refuse in a combustion installation, a considerable amount of pollutants, such as nitrogen oxides, hydrocarbons, carbon monoxide, sulfur oxides, and, in particular, dioxins and furans, are formed and can pass into the environment through the exhaust gas from the combustion installation. Examples of a combustion installation that emits pollutants include a boiler plant, a coal-fired, oil-fired, or gas-fired power plant, a gas turbine, or an internal-combustion engine, in particular, a diesel engine. A refuse incineration plant also emits the above-mentioned pollutants.

Due to stringent statutory provisions that limit the amount of the above-mentioned pollutants that can be released, an additional treatment of the exhaust gases is required for the combustion installations to reduce the levels of pollutants contained therein. For such a purpose, a wide range of catalytic converters has been developed in the past that convert the pollutants into non-hazardous compounds.

In the event of an unsuitable exhaust-gas composition, it is from time to time necessary for a reagent to be added to the exhaust gas as well, which reacts, at a suitable catalytic converter, with the pollutant that is to be eliminated, to form non-hazardous compounds. For example, to break nitrogen oxides in an oxygen-containing exhaust gas, a suitable reducing agent must be added as a reagent, and, in the presence of oxygen, the reducing agent also reduces the nitrogen oxides contained in the exhaust gas to form non-hazardous nitrogen. The reaction can be catalyzed by a deNOx catalytic converter that is based on titanium dioxide with additions of vanadium pentoxide, molybdenum trioxide, and/or tungsten trioxide. At the deNOx catalytic converter, the nitrogen oxides are reacted with the reducing agent, usually ammonia, to form nitrogen and water in accordance with the selective catalytic reduction (SCR) process.

To completely break down the pollutant in the exhaust gas, the reagent, which is added separately, has to be added in a stoichiometric quantity with respect to the concentration of the pollutant. Therefore, the addition of the reagent is demand-dependent, in other words, is dependent on the quantity of pollutant emitted from the combustion installation per unit time.

Particularly in the case of a combustion installation that operates with frequent load changes, such as, for example, a diesel engine that is used to drive a vehicle, it is difficult to determine the quantity of reagent that is to be introduced per unit time. It is necessary for the quantity of reagent metered in to be varied quickly and to be adjusted accurately because the emission level of pollutants varies considerably within short time intervals according to the frequent load changes.

For demand-dependent, exact metering of the reagent, accurate knowledge of the quantity of pollutant that is actually emitted from the combustion installation is required. In the case of a combustion installation that is operated under steady-state conditions, knowledge of the quantity of pollutant that is actually emitted can be achieved by measuring the concentration of the pollutant in the exhaust gas. To make such measurements, a pollutant-sensitive sensor is placed in the exhaust gas and the measured values from the sensor are used to control the quantity of reagent introduced.

However, if the quantity of pollutant emitted varies rapidly, it is no longer possible to directly measure the concentration of the pollutant in the exhaust gas. Pollutant sensors that would be sufficiently quick for real-time measurement are as yet unknown. Sensors for determining pollutant concentrations in gaseous media are generally constructed as conductivity or capacitance sensors, in other words, as sensors that are based on a material whose conductivity or capacitance reacts sensitively to the pollutant. Because the pollutant has to penetrate into the material, such sensors have a relatively long response time, making direct measurement of the concentration of the pollutant impossible if the concentration varies very rapidly.

Even if sensors existed with a sufficiently rapid response time, in a combustion installation that is operated with frequent and rapid load changes, a measured-value oriented control of the quantity of reagent introduced does not result in the maximum possible conversion of the pollutant. The reason for this is that an adsorption of the reagent on the catalytic converter is required to catalytically break down the pollutant. Such an adsorption process proceeds relatively slowly in kinetic terms. Therefore, in the event of rapid load changes, a quantity of reagent that is tailored to the currently measured concentration of the pollutant does not lead to the maximum possible conversion.

To solve the problem, German Published, Non-Prosecuted Patent Application D 43 15 278 A1, corresponding to U.S. Pat. No. 5,628,186, discloses using operationally relevant parameters of the combustion installation to calculate, in advance, the quantity of pollutant emitted in the corresponding operating state or a value for the current concentration of the pollutant. The quantity of reagent introduced is controlled according to the precalculated value. Operationally relevant parameters specified for a diesel engine are air mass flow rate, control rod travel, charge air pressure, torque, and rotational speed. The advance calculation of the current concentration of the pollutant in the exhaust gas takes place based on a characteristic diagram that is implemented in a control unit and in which each family of parameters corresponding to a defined operating state of the combustion installation is assigned a concentration value for the pollutant. Such a characteristic diagram is determined, for example, by test runs on an engine test bed.

However, a drawback of such a characteristic-diagram-oriented control method is that the quantity of reagent that is actually introduced has to be selected to be smaller than the quantity that should he introduced stoichiometrically according to the precalculated concentration. Such a selection is required because a certain safety margin has to be maintained, so that slippage of the reagent, which for example in the case of ammonia has a toxic action, is reliably avoided. The reason for the procedure is, first, an inevitable production spread in the combustion installations and, second, an aging of the combustion installation or its components during operation. Both of these factors lead to the rigidly implemented characteristic diagram no longer correctly reproducing the actual relationships between the current operating state of the combustion installation and the quantity of pollutant emitted. Therefore, the characteristic diagram is used to precalculate a quantity of pollutant that does not correspond to the quantity of pollutant actually emitted. The process leads to incorrect metering of the reagent.

Accordingly, if the quantity of reaction quantity introduced is controlled based on a rigid characteristic diagram, it is, accordingly, not possible to achieve a maximum conversion of the pollutant if, at the same time, slippage of the reagent in the environment is to be reliably avoided.

As a solution to the problem, German Published, Non-Prosecuted Patent Application DE 195 36 571 A1 discloses checking the predetermined characteristic diagram while the combustion installation is operating and adapting it to the current state of the combustion installation. To carry out the check, sensors record the current pollutant concentration and the concentration is compared with the precalculated value. The characteristic diagram is then adapted to the actually emitted value by mathematical methods.

However, it is a drawback that the imperative need to measure the concentration of the pollutant to correct the characteristic diagram in practice entails high measurement errors due to the inadequacy of the sensors. The above-mentioned concept has only a limited suitability for a combustion installation in which the quantity of exhaust gas varies very rapidly.

SUMMARY OF THE INVENTION

It is accordingly an object of the invention to provide a process and apparatus for the catalytic elimination of a pollutant from the exhaust gas from a combustion installation, in particular, a diesel engine, by a reagent, that overcomes the hereinafore-mentioned disadvantages of the heretofore-known devices and methods of this general type and that controls the quantity of reagent introduced based on a characteristic diagram, which leads to a high conversion of the pollutant being achieved even in a combustion installation that is operated with frequent and rapid load changes. The high conversion is to be ensured equally well in the event of aging or production spreads in the combustion installation.

With the foregoing and other objects in view, there is provided, in accordance with the invention, a process for the catalytic removal of a pollutant from an exhaust gas from a combustion installation having operationally relevant parameters including the steps of calculating, from operationally relevant parameters of a combustion installation, a concentration of a pollutant in an exhaust gas with a predetermined characteristic diagram, introducing a predetermined quantity of a reagent into the exhaust gas per unit time as a function of the calculated concentration of the pollutant, the reagent reacting with the pollutant at a catalytic converter, determining operating states of the combustion installation with substantially constant pollutant emission levels, determining, with a sensor, the concentration of the pollutant in the exhaust gas during an operating state of the combustion installation with a substantially constant pollutant emission level and using only a concentration of the pollutant from a combustion installation in a steady operating state to correct the characteristic diagram, and calculating the concentration of the pollutant in the exhaust gas from a combustion installation with the characteristic diagram in a non-steady operating state.

With regard to the process, the objectives of the invention are achieved by a process for the catalytic removal of a pollutant from the exhaust gas from a combustion installation, in particular, a diesel engine. The concentration of the pollutant in the exhaust gas is calculated by a predetermined characteristic diagram from operationally relevant parameters of the combustion installation. A predetermined quantity of a reagent is introduced into the exhaust gas per unit time as a function of the calculated concentration of the pollutant and is reacted with the pollutant at a catalytic converter, in which process, according to the invention, operating states of the combustion installation with a substantially constant pollutant emission levels are determined. During an operating state of the combustion installation with a substantially constant pollutant emission level, the concentration of the pollutant in the exhaust gas is determined by a sensor and is used for a correction of the characteristic diagram.

The invention is based on the consideration that sensors for recording the concentration of the pollutant that have become known to date and are inadequate due to their response time, in the event of a temporarily constant emission level of the pollutant, generally record the actual concentration value. Consequently, it is possible to determine the concentration of the pollutant in the exhaust gas from a combustion installation during an operating state with a substantially constant pollutant emission level without major measurement errors. Also, such a process allows a dynamic equilibrium to prevail on the catalytic converter during an operating state with regard to the adsorption of the reagent. Therefore, adsorption processes do not influence the measurement.

Furthermore, the invention is based on the consideration that a constant pollutant emission level occurs in a large number of operating states of the combustion installation that differ by virtue of the other operationally relevant parameters. For example, a diesel engine that is used to pull a truck, is distinguished by a constant pollutant emission level both during an idling phase and, equally when the truck is driving at a constant speed and with a high load. However, the two operating states described differ, in particular, with regard to the accelerator pedal position, the torque, and the fuel consumption.

The invention is furthermore based on the consideration that, over time, most of the families of parameters that are covered by the characteristic diagram are covered by operating states with a constant pollutant emission level. The effect allows simple and reliable, gradual correction of the overall characteristic diagram and, therefore, allows the characteristic diagram to be adapted to the current state of the combustion installation.

In accordance with another mode of the invention, a sensor determines the operating states with a substantially constant pollutant emission level. For such a purpose, the measured value supplied by the sensor is monitored continuously during operation. If the measured value remains constant for a predeterminable time period, an operating state of such a type is recognized as an operating state with a constant pollutant emission level. The characteristic diagram is used to calculate the assumed value of the concentration of the pollutant associated with the defined operating state based on the other operationally relevant parameters that are available, for example, through an interface with the control unit of the combustion installation. The calculated value is then used to correct the characteristic diagram.

In accordance with a further mode of the invention, an operating state of the combustion installation is determined as an operating state with a substantially constant pollutant emission level when the sensor measures a constant value over a time period that is longer than its response time. The shorter the time that can be predetermined for estimation of the constant emission level, the greater the measurement errors become for the determined concentration of the pollutant and, therefore, for the correction of the characteristic diagram. However, the correction of the overall characteristic diagram will take place more quickly.

In accordance with an added mode of the invention, to correct the characteristic diagram, the value for the concentration of the pollutant that is predetermined in the characteristic diagram is compared with the value for the concentration of the pollutant that has been determined by the sensor, and in that in the event of a deviation that lies outside a predetermined tolerance band the predetermined value is replaced by the determined value. In a combustion installation with frequent load changes or frequently differing operating states, point by point correction rapidly leads to the overall characteristic diagram being adapted to the current state of the combustion installation.

In accordance with an additional mode of the invention, the concentration of the pollutant in the exhaust gas is determined directly by a pollutant-sensitive sensor. The measured value supplied by such a sensor is proportional to the concentration of the pollutant and can then be directly converted into the concentration.

In accordance with yet another mode of the invention, for such a purpose, the concentration of the pollutant is determined as a result of a sensor that is sensitive to a further component of the exhaust gas and is used to measure the concentration of the further component, and in that the concentration of the pollutant from the concentration of the further component is determined. Such a procedure is recommended if no suitable sensors are available for the pollutant to be measured. For conversion, it has to be assumed that the composition of the exhaust gas emitted from the combustion installation is subject to certain laws. If the concentration of one component of the exhaust gas rises or falls, it is possible to conclude that the other component is rising or falling. For example, in the exhaust gas from a diesel engine, the concentration of the nitrogen oxides can be worked out from the concentration of the carbon monoxide and/or of the hydrocarbons.

In accordance with yet a further mode of the invention, ammonia or a substance that releases ammonia, in particular, urea, is added to the exhaust gas as reagent, and as the pollutant nitrogen oxides are reacted, in accordance with the selective catalytic reduction (SCR) process, on a deNOx catalytic converter.

In such a case, it is advantageous if the concentration of nitrogen oxides in the exhaust gas is determined by using a sensor to measure the concentration of hydrocarbons or carbon monoxide in the exhaust gas and drawing a conclusion as to the concentration of nitrogen oxides from the concentration of hydrocarbons or carbon monoxide.

With the objects of the invention in view, there is also provided an apparatus for the catalytic removal of a pollutant from exhaust gas of a combustion installation, in particular, a diesel engine, having operationally relevant parameters, including an exhaust-gas duct connected to a combustion installation for directing flow of an exhaust gas containing at least one pollutant, a sensor disposed in the exhaust-gas duct for producing output values, an introduction apparatus for introducing a reagent into the exhaust gas, a catalytic converter for reacting the reagent with the at least one pollutant, the catalytic converter fluidically connected to the exhaust-gas duct to conduct the exhaust gas flow, a predetermined characteristic diagram, a control unit for receiving operationally relevant parameters of the combustion installation, the control unit connected to the sensor, to the characteristic diagram, to the combustion installation, and to the introduction apparatus, the control unit programmed to calculate a concentration of the at least one pollutant from the operationally relevant parameters based on the predetermined characteristic diagram and to control a throughput of the reagent in the introduction apparatus as a function of a calculated concentration, and the control unit programmed to determine the concentration of the at least one pollutant based upon the output values from the sensor, to detect an operating state of the combustion installation with a substantially constant pollutant emission level, and to correct the characteristic diagram only based on a value of the concentration of the at least one pollutant from the combustion installation in a steady operating state determined by the sensor during such an operating state.

With regard to the apparatus, the above-mentioned objectives are achieved by an apparatus for the catalytic removal of a pollutant from the exhaust gas of a combustion installation, in particular, a diesel engine, having an exhaust-gas duct, an introduction apparatus for introducing a reagent into the exhaust gas, a catalytic converter through which the exhaust gas can flow for reacting the reagent with the pollutant, and a control unit that is connected to the combustion installation and the introduction apparatus. Operationally relevant parameters of the combustion installation are available to the control unit and the control unit is configured to calculate the concentration of the pollutant from the operationally relevant parameters based on the predetermined characteristic diagram and to control the reagent throughput in the introduction apparatus as a function of the calculated concentration. In the apparatus according to the invention, a sensor that is connected to the control unit is disposed in the exhaust-gas duct. The control unit is additionally configured to determine the concentration of the pollutant in the exhaust gas by the values that are available through the sensor, to detect an operating state of the combustion installation with a substantially constant pollutant emission level, and to correct the characteristic diagram based on the value of the concentration of the pollutant that is determined by the sensor during such an operating state.

The introduction apparatus may, in a conventional manner, be constructed as an injection valve, an injection nozzle, or, in the case of a large combustion installation, as an injection grid that is distributed over the cross section of the exhaust-gas duct. The reagent throughput can be controlled either by direct control of the injection nozzle or the injection valve, or by a controllable valve disposed in the feed line for the reagent.

To record the operationally relevant data of the combustion installation, suitable sensor elements are assigned to the control unit in the combustion installation. The measured values from the sensors are available to the control unit through corresponding data lines. Particularly in the case of an internal-combustion engine with electronic engine management, the operationally relevant parameters are particularly simple to record and transmit. First, such an engine has the necessary sensors for recording the operationally parameters. Second, such an engine management system inherently has an electronic interface through which the operationally relevant parameters, which the engine management system monitors, are available. Through such an interface, parameters of the internal-combustion engine, such as, for example combustion temperature, fuel consumption, torque, rotational speed, but also injection time and the like, can be picked up in a simple manner.

The sensor, as seen in the direction of flow of the exhaust gas, is usually disposed upstream of the catalytic converter. As such, the pollutant emission level emitted from the combustion installation can be measured directly. However, it is also conceivable for the sensor to be disposed downstream of the catalytic converter. As such, the functioning of the catalytic converter can be monitored at the same time. However, it then becomes relatively difficult to convert the values measured by the sensor to the concentration of the emitted pollutant level.

In accordance with yet an added feature of the invention, the control unit is configured to compare the value for the concentration of the pollutant that is predetermined in the characteristic diagram with the value that is determined by the sensor during the operating state with a substantially constant pollutant emission level, and to correct the characteristic diagram by replacing the predetermined value in the characteristic diagram with the determined value in the event of a deviation that lies outside a predetermined tolerance band. As such, the overall characteristic diagram is gradually adapted, in a simple and effective manner, to the current state of the combustion installation.

In accordance with yet an additional feature of the invention, the sensor is preferably a pollutant-sensitive sensor. The control unit can use the recorded measured values to calculate directly back to the current concentration of the pollutant in the exhaust gas.

In another advantageous configuration, the sensor is a sensor that is sensitive to a further exhaust-gas component. The alternative is recommended if there is no sensor available that is suitable for the pollutant. The control unit can then use a correspondingly predetermined relationship to calculate the concentration of the pollutant.

In accordance with again another feature of the invention, the sensor is additionally sensitive to an exhaust-gas component different from the at least one pollutant.

In accordance with a concomitant feature of the invention, the catalytic converter is a deNOx catalytic converter in honeycomb or plate form for removing nitrogen oxides with a reducing agent. For such a purpose, the catalytic converter includes the following materials: titanium dioxide in a proportion of from 70 to 95% by weight; tungsten trioxide and/or molybdenum trioxide in a proportion of from 5 to 20% by weight; and vanadium pentoxide in a proportion of less than 5% by weight. Such a catalytic converter is particularly suitable for breaking down nitrogen oxides using the SCR process.

If the invention is constructed as an apparatus for removing nitrogen, it is advantageous, in particular, if there is no rapid and sensitive nitrogen sensor, to use a sensor that is sensitive to a further exhaust-gas component. As such, it is recommended to use a hydrocarbon sensor or a carbon monoxide sensor.

Other features that are considered as characteristic for the invention are set forth in the appended claims.

Although the invention is illustrated and described herein as embodied in a process and apparatus for the catalytic elimination of a pollutant from the exhaust gas from a combustion installation, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWING

The FIGURE is a diagrammatic illustration of a diesel engine with an apparatus for the catalytic removal of nitrogen oxides from the exhaust gas connected to the engine according to the invention.

DESCRIPTION OF THE PREFERRED EMBODIMENTS

Referring now to the single FIGURE of the drawing, a combustion installation 1 is shown that is a diesel engine equipped with an apparatus for the catalytic removal of the nitrogen oxides. The diesel engine has an interface 3 at which the current values of operationally relevant parameters can be tapped electronically. Operationally relevant parameters are available, in particular, the rotational speed, the torque, the operating temperature, the fuel consumption, and the injection time. A fuel/air mixture for combustion is made available to the diesel engine through a fuel feedline 4 and an air connection 5. The exhaust gas 6 from the diesel engine is passed into an exhaust-gas duct 7 through a manifold and is guided to the outside through a catalytic converter 8. The catalytic converter 8 is configured as a deNOx catalytic converter that uses the conventional SCR process to break down nitrogen oxides, with the aid of the reagent ammonia, to form molecular nitrogen and water. The quantity of ammonia required is obtained in the exhaust gas 6 by hydrolysis and pyrolysis of urea, which is metered in.

An introduction device 9, which includes a storage vessel 11 for the reagent 10 (urea), a feedline 12, a controllable metering valve 13 with a control line 25, and an injection nozzle 14, is provided for metering the urea.

The catalytic converter 8 is constructed as a honeycomb body through which the exhaust gas can flow and that has a number of parallel flow passages. The honeycomb body is constructed as a unsupported extrudite including a ceramic material containing 80% by weight of titanium dioxide, 8% by weight of tungsten trioxide, less than 2% by weight of vanadium pentoxide, remainder inorganic support, and film-forming agents. The configuration of the catalytic converter 8 depends on the occurrence and pressure of the exhaust gas from the diesel engine.

In addition, a sensor for recording the nitrogen oxide concentration or nitrogen oxide sensor 15 in the exhaust gas 6 is disposed between the combustion installation 1 and the catalytic converter 8 in the exhaust-gas duct 7. The nitrogen oxide sensor 15 may, for example, be a capacitance sensor or conductivity sensor.

To control the reagent throughput in the introduction apparatus 9, a control unit 18 is provided. Through the outputs 19, 20, 21 of the interface 3 of the diesel engine, the current values for rotational speed, torque, operating temperature, fuel consumption, and injection time are available to the control unit 18 as operationally relevant parameters. Furthermore, a value that is proportional to the nitrogen oxide concentration in the exhaust gas can be accessed through the output 22 of the nitrogen oxide sensor 15.

The control unit 18, starting from the current parameter values, calculates the concentration of the nitrogen oxides in the emitted exhaust gas 6 from the diesel engine which is to be expected for a time section with a characteristic diagram that has been defined on an engine test bed for the type of diesel engine in question. The characteristic diagram is implemented in the control unit 18 in the form of stored values. An associated quantity of reagent is metered into the exhaust gas 6 per unit time according to the precalculated concentration.

In addition, the control unit 18 continuously checks the values supplied from the nitrogen oxide sensor 15. If the values do not change within a predetermined time period, which is generally selected to be slightly longer than the response time of the sensor, the control unit 18 interprets the corresponding operating state of the diesel engine as an operating state with a substantially constant pollutant emission level.

The value of the concentration of the nitrogen oxides that has been determined with the nitrogen oxide sensor 15 for an operating state of such a nature is compared with the value calculated in advance for the operating state of the diesel engine with the characteristic diagram. During the comparison, the operationally relevant parameters recorded in the last working cycle of the control unit are used. If the difference between the precalculated value and the value recorded with the nitrogen oxide sensor 15 lies outside a predetermined tolerance, the value associated with the present parameters for the concentration of the nitrogen oxides in the emitted exhaust gas 6 is replaced in the characteristic diagram by the recorded, i.e., measured, value. Over time, such a procedure results in an adaptation of the overall implemented characteristic diagram to the current state of the diesel engine.

As such, aging phenomena or tolerances in the engines within one type are taken into account in a simple manner. It is ultimately possible to further reduce the safety margin between the quantity of reagent metered in and the quantity required for maximum conversion of the nitrogen oxides when compared to the prior art. Therefore, by adapting the characteristic diagram, it is possible to achieve a high level of conversion of the nitrogen oxides combined with a low risk of ammonia slippage.

As an alternative, a hydrocarbon sensor or a carbon monoxide sensor 16 can also be used as a sensor for recording the concentration of the nitrogen oxides for an exhaust gas from a diesel engine. Due to the combustion conditions in the diesel engine, the concentration of the nitrogen oxides can be worked out from the concentration of hydrocarbons or of carbon monoxide in the exhaust gas from a diesel engine.

We claim:

1. A process for the catalytic removal of a pollutant from an exhaust gas from a combustion installation having operationally relevant parameters, which comprises:
   calculating, from operationally relevant parameters of a combustion installation, a concentration of a pollutant in an exhaust gas with a predetermined characteristic diagram;
   introducing a predetermined quantity of a reagent into the exhaust gas per unit time as a function of the calculated concentration of the pollutant, the reagent reacting with the pollutant at a catalytic converter;
   determining a steady operating state of the combustion installation with substantially constant pollutant emission level;
   determining, with a sensor, the concentration of the pollutant in the exhaust gas during the steady operating state of the combustion installation with a substantially constant pollutant emission level and using only the determined concentration of the pollutant during the steady operating state to correct the characteristic diagram; and
   calculating the concentration of the pollutant in the exhaust gas from a combustion installation with the characteristic diagram in a non-steady operating state.

2. The process according to claim 1, which further comprises determining, with the sensor, the steady operating state with the substantially constant pollutant emission level.

3. The process according to claim 2, which further comprises determining an operating state of the combustion installation as the steady operating state with a substantially constant pollutant emission level when the sensor measures a constant value over a time period longer than a response time of the sensor.

4. The process according to claim 1, which further comprises:
   comparing a value for the concentration of the pollutant predetermined in the characteristic diagram with the value for the concentration of the pollutant determined by the sensor to correct the characteristic diagram; and
   replacing the predetermined value with the determined value in the event of a comparison deviation lying outside a predetermined tolerance band.

5. The process according to claim 1, which further comprises directly determining the concentration of the pollutant in the exhaust gas with a pollutant-sensitive sensor.

6. The process according to claim 1, which further comprises:
   determining the concentration of the pollutant as a result of another sensor sensitive to a component of the exhaust gas;
   measuring a concentration of the component with the other sensor; and
   determining the concentration of the pollutant from the concentration of the component.

7. The process according to claim 1, which further comprises:
   adding one of ammonia and a substance releasing ammonia to the exhaust gas as the reagent; and
   reacting the pollutant nitrogen oxides with a denox catalytic converter in accordance with the selective catalytic reduction process.

8. The process according to claim 1, wherein the substance releasing ammonia is urea.

9. The process according to claim 7, which further comprises
   determining a concentration of nitrogen oxides in the exhaust gas with a sensor used to measure a concentration of at least one of hydrocarbons and carbon monoxide in the exhaust gas; and
   drawing a conclusion as to the concentration of nitrogen oxides from the concentration measured by the sensor.

10. A process for the catalytic removal of a pollutant from an exhaust gas from a diesel engine, which comprises:

calculating, from operationally relevant parameters of a combustion installation, a concentration of a pollutant in an exhaust gas with a predetermined characteristic diagram;

introducing a predetermined quantity of a reagent into the exhaust gas per unit time as a function of the calculated concentration of the pollutant, the reagent reacting with the pollutant at a catalytic converter;

determining a steady operating state of the combustion installation with substantially constant pollutant emission level;

determining, with a sensor, the concentration of the pollutant in the exhaust gas during the operating state of the combustion installation with a substantially constant pollutant emission level and using only the determined concentration of the pollutant during the steady operating state to correct the characteristic diagram; and calculating the concentration of the pollutant in the exhaust gas from a combustion installation with the characteristic diagram in a non-steady operating state.

11. An apparatus for the catalytic removal of a pollutant from exhaust gas of a combustion installation having operationally relevant parameters, comprising:

an exhaust-gas duct connected to a combustion installation for directing flow of an exhaust gas containing at least one pollutant;

a sensor disposed in said exhaust-gas duct for producing output values;

a reagent;

an introduction apparatus for introducing said reagent into the exhaust gas;

a catalytic converter for reacting said reagent with the at least one pollutant, said catalytic converter fluidically connected to said exhaust-gas duct to conduct the exhaust gas flow;

a predetermined characteristic diagram;

a control unit for receiving operationally relevant parameters of the combustion installation, said control unit connected to said sensor, to said characteristic diagram, to the combustion installation, and to said introduction apparatus;

said control unit programmed to calculate a concentration of the at least one pollutant from the operationally relevant parameters based on said predetermined characteristic diagram and to control a throughput of said reagent in said introduction apparatus as a function of a calculated concentration; and said control unit programmed:
to determine the concentration of the at least one pollutant based upon said output values from said sensor;
to detect a steady operating state of the combustion installation with a substantially constant pollutant emission level; and
to correct said characteristic diagram only based on a value of the concentration of the at least one pollutant determined by said sensor during said operating state.

12. The apparatus according to claim 11, wherein said control unit is programmed:

to compare the value for the concentration of the at least one pollutant predetermined in said characteristic diagram with a value determined by said sensor during the steady operating state with a substantially constant pollutant emission level; and to correct said characteristic diagram by replacing the predetermined value in said characteristic diagram with the value determined by said sensor in the event of a deviation lying outside a predetermined tolerance band.

13. The apparatus according to claim 11, wherein said sensor is a pollutant-sensitive sensor.

14. The apparatus according to claim 11, wherein said sensor is additionally sensitive to an exhaust-gas component different from the at least one pollutant.

15. The apparatus according to claim 11, wherein said catalytic converter is a deNox catalytic converter for removing nitrogen oxides with a reducing agent, said deNOx catalytic converter has one of a honeycomb and a plate configuration, and said deNOx catalytic converter is made from 70 to 95% by weight of titanium dioxide, 5 to 20% by weight of at least one of tungsten trioxide and molybdenum trioxide, and less than 5% by weight of vanadium pentoxide.

16. An apparatus for the catalytic removal of a pollutant from exhaust gas of a diesel engine having operationally relevant parameters, comprising:

an exhaust-gas duct connected to a combustion installation for directing flow of an exhaust gas containing at least one pollutant;

a sensor disposed in said exhaust-gas duct for producing output values;

a reagent;

an introduction apparatus for introducing said reagent into the exhaust gas;

a catalytic converter for reacting said reagent with the at least one pollutant, said catalytic converter fluidically connected to said exhaust-gas duct to conduct the exhaust gas flow;

a predetermined characteristic diagram;

a control unit for receiving operationally relevant parameters of the combustion installation, said control unit connected to said sensor, to said characteristic diagram, to the combustion installation, and to said introduction apparatus;

said control unit programmed to calculate a concentration of the at least one pollutant from the operationally relevant parameters based on said predetermined characteristic diagram and to control a throughput of said reagent in said introduction apparatus as a function of a calculated concentration; and said control unit programmed:
to determine the concentration of the at least one pollutant based upon said output values from said sensor;
to detect a steady state of the combustion installation with a substantially constant pollutant emission level; and
to correct said characteristic diagram only based on a value of the concentration of the at least one pollutant determined by said sensor during the steady operating state.

* * * * *